United States Patent
Brinkmann et al.

(10) Patent No.: US 11,899,339 B2
(45) Date of Patent: Feb. 13, 2024

(54) ULTRASHORT PULSE LASER SYSTEM HAVING A QUICKLY TUNABLE CENTRAL WAVELENGTH

(71) Applicant: REFINED LASER SYSTEMS GMBH, Münste (DE)

(72) Inventors: Maximillian Brinkmann, Münster (DE); Carsten Fallnich, Lehrte (DE); Tim Hellwig, Munich (DE)

(73) Assignee: REFINED LASER SYSTEMS GMBH, Münster (DE)

( * ) Notice: Subject to any disclaimer, the term of this patent is extended or adjusted under 35 U.S.C. 154(b) by 855 days.

(21) Appl. No.: 16/771,595

(22) PCT Filed: Dec. 5, 2018

(86) PCT No.: PCT/EP2018/083632
§ 371 (c)(1),
(2) Date: Oct. 20, 2020

(87) PCT Pub. No.: WO2019/115310
PCT Pub. Date: Jun. 20, 2019

(65) Prior Publication Data
US 2021/0033945 A1   Feb. 4, 2021

(30) Foreign Application Priority Data
Dec. 12, 2017 (DE) ............ 10 2017 129 637.9

(51) Int. Cl.
*G02F 1/39* (2006.01)
*H01S 3/067* (2006.01)
(Continued)

(52) U.S. Cl.
CPC ............... *G02F 1/395* (2013.01); *G02F 1/39* (2013.01); *G02F 1/392* (2021.01);
(Continued)

(58) Field of Classification Search
CPC .......... G02F 1/3542; G02F 1/39; G02F 1/392; G02F 1/395; G02F 2201/02;
(Continued)

(56) References Cited

U.S. PATENT DOCUMENTS 7,630,418 B2 * 12/2009 Franjic ............... B23K 26/0624
  372/4
10,761,402 B2 * 9/2020 Brinkmann ........... H01S 5/0092
(Continued)

FOREIGN PATENT DOCUMENTS

CN   106654829 A   5/2017

OTHER PUBLICATIONS

Maximillian Brinkmann et al, "Elecronically and rapidly tunable fiber-integrable optical parametric oscillator for nonlinear microscopy" Optic Letters, US vol. 41. No. 10, May 15, 2016(May 15, 2016), p. 2193.
(Continued)

*Primary Examiner* — Daniel Petkovsek
(74) *Attorney, Agent, or Firm* — 24IP Law Group USA, PLLC; Timothy R DeWitt (57) ABSTRACT

The present invention relates to a system and method for generating wavelength-tunable laser output pulses using parametric processes, wherein a simultaneous and tuned tuning of the pump pulse wavelength and repetition rate ensures a temporal overlap between pump and seed pulses in a parametric gain medium. Based on this parameter coupling, lasers with a wide tunable wavelength range can be obtained, which can be fully fiber-based and which are also suitable for modern nonlinear microscopy or fluorescence microscopy due to a particularly fast response.

12 Claims, 5 Drawing Sheets

(51) Int. Cl.
  *H01S 3/10* (2006.01)
  *H01S 3/1112* (2023.01)
  *G02F 1/35* (2006.01)

(52) U.S. Cl.
  CPC ...... *H01S 3/06791* (2013.01); *H01S 3/10046* (2013.01); *H01S 3/1112* (2013.01); *G02F 1/3542* (2021.01); *G02F 2201/02* (2013.01); *G02F 2201/307* (2013.01); *G02F 2203/15* (2013.01)

(58) Field of Classification Search
  CPC ........... G02F 2201/307; G02F 2203/15; H01S 3/06791; H01S 3/10046; H01S 3/1112
  See application file for complete search history.

(56) References Cited

U.S. PATENT DOCUMENTS

| | | | |
|---|---|---|---|
| 11,211,762 B2* | 12/2021 | Gottschall | H01S 3/094076 |
| 11,579,512 B2* | 2/2023 | Gottschall | H01S 3/1305 |
| 2015/0015938 A1 | 1/2015 | Kieu et al. | |

OTHER PUBLICATIONS

Maximillian Brinkmann et al, "Optical parametric chirped pulse oscillation", Optic Express, US vol. 25. No. 11, May 29, 2017(May 29, 2017), p. 12884-12895.

Gottshall Thomas et al: "Four-wave mixing based light sources for real-world biomedical applications of coherent Raman microscopy", Progress in Biomedical Optics and Imaging, SPIE—International Society for Optical Engineering, Bellingham, WA, US, Bd. 9712, Mar. 14, 2016 (Apr. 14, 2016), p. 971202.

Shenping Li et al, "Electrical wavelength-tunable actively mode-locked fiber ring laser with a linearly chirped fiber Bragg grating", IEEE Photonics Technology Letters, IEEE Service Center, Piscataway, NJ, US, Bd. 10, Nr. 6, Jun. 1, 1998 (Jun. 1, 1998), pp. 799-801.

* cited by examiner

Time of Arrival at the Parametric Amplifier

ULTRASHORT PULSE LASER SYSTEM HAVING A QUICKLY TUNABLE CENTRAL WAVELENGTH

BACKGROUND OF THE INVENTION

Field of the Invention

The present invention relates to a system and method for generating wavelength-tunable laser output pulses using parametric processes, wherein a simultaneous and coordinated tuning of the pump pulse wavelength and repetition rate ensures a temporal overlap between pump and seed pulses in a parametric gain medium. Based on this parameter coupling, lasers with a wide tunable wavelength range can be obtained, which can be fully fiber-based and which are also suitable for modern nonlinear or fluorescence-based microscopy due to a particularly fast response.

Brief Description of the Related Art

Over the last decades, improved analytical methods have enabled more and more extensive characterization of samples of all kinds and have contributed to a deep understanding of e.g. the structures and reaction mechanisms of biological systems. Among the most commonly used analytical methods are spectroscopic methods, which are, at least in principle, capable of resolving even larger structures and reaction processes in samples in real time with a spatial resolution in the sub-micrometer range. Laser-based methods such as multiphoton microscopy (MPM) and especially nonlinear coherent Raman spectroscopy (CRS) are particularly suitable as a subclass, since in the best case they can image the behavior of molecules in their "natural" chemical environment without additional staining. The basis of these modern methods is the further development in laser technology, which has led to the fact that, in addition to the basic advantages of laser light, flexible experiments can now be carried out with a single laser setup, for example at different wavelengths. However, due to the complexity of the devices available on the market and the associated costs for acquisition and maintenance, the majority of these applications are currently still limited to specialized laboratories. In order to make these techniques suitable for mass production and to enable a further flexibilization of the experiments to be carried out, a transformation into simple, low-maintenance and robust, for example fiber-based setups is necessary.

Well known are laser systems that achieve output wavelength detuning by changing the repetition rate (e.g. Shenping L. et al. in "Electrical wavelength-tunable actively mode-locked fiber ring laser with a linearly chirped fiber Bragg grating. IEEE Photonics Technology Letters" 10, 799-801 (1998)). In this paper, the repetition rate is only considered as a parameter for tuning the wavelength of the pump laser. The exact value of the repetition rate is of no further interest, and only a small wavelength change of the pump laser is obtained, which is limited to the gain ranges of existing laser materials. A use in connection with parametric amplifier systems is not disclosed.

A possibility to quickly change the wavelength of fiber-integrable parametric oscillators (FOPOs) is described for example in Brinkmann, M. et al. "Electronically and rapidly tunable fiber-integrable optical parametric oscillator for nonlinear microscopy" Optics Letters, 41, 2193, (2016)". The wavelength change is obtained by using a dispersive filter in the FOPO and tuning the repetition rate of the pump laser. The disadvantage of this technical solution, however, is that the parametric gain spectrum must provide all wavelengths to be generated simultaneously at a fixed pump wavelength. This means that the pumping is done near the zero dispersion wavelength of the parametric amplifier. Accordingly, the maximum achievable tunability is limited (1100 nm to 1300 nm for the idler pulse). A further disadvantage of the used method is the high peak power of the pump pulse (approx. 5 kW) which is necessary to achieve a wide amplification range. Pump pulses with such a high peak power make the fiber integration of the pump pulses up to the parametric gain medium much more difficult in practice due to pulse-changing non-linear effects.

The tuning range of a FOPO can be extended by slightly detuning the wavelength of the pump pulses. In this case a small change of the pump pulse wavelength is translated by a steep phase matching curve of the parametric gain medium into a large wavelength change of the FOPO output pulses. This principle was used e.g. in T. Gottschall et al. "Four-wave mixing based light sources for real-world biomedical applications of coherent Raman microscopy" (Proc. of SPIE, Vol. 9712, p. 971202, 2016). Disadvantage of this technique is that in order to detune the FOPO wavelength, both the wavelength of the pump pulses and the repetition rate of the pump pulses must be detuned in order to capture the time overlap between pump pulses and seed pulses in the gain medium. For this reason, known systems always require the independent control of two parameters (repetition rate and central wavelength of the pump pulses), which results in an increased material costs and control engineering effort. Since these required control loops are typically based on mechanical delay sections or temperature changes, known systems can only be detuned on relatively slow time scales (over 100 ms). Another disadvantage of known systems is that typical designs do not allow a complete integration into robust fiber optics, which makes a successful, cost-efficient and low-maintenance application outside of specialized laser laboratories considerably more difficult or even impossible.

SUMMARY OF INVENTION

Therefore, the object of the present invention is to open up a flexible laser system that can be implemented without mechanical delay lines or temperature tuning, in which the output wavelength can be tuned very fast and in a wide range. It is further the object of the present invention to disclose a method for the rapid tuning of laser output waves.

According to the invention, a system for the generation of laser pulses of variable wavelength, which comprises at least a pump pulse generator for generating pump pulses and an optical parametric amplification medium pumped by the pump pulse generator,
which converts incoming pump pulses, stimulated by further seed pulses, into wavelength-shifted signal pulses and wavelength-shifted idler pulses, wherein the wavelength of the pump pulses is adjustable directly or by means of the repetition rate of the pump pulse generator, and wherein in the event of a change of one of the repetition rate or the wavelength, the other one of the repetition rate or the wavelength changes simultaneously in such a way that the pump pulses and the seed pulses overlap in time in the optical parametric amplification medium. Surprisingly, it has been shown that by means of the laser system constructed according to the invention, laser pulses can be generated which can be tuned over a wide range of wavelengths, wherein, in particular, the change between different wavelengths occurs within a very short time scale. For example, parametric laser systems are available which can be easily set up in a fiber-integrated design and are electronically tunable in a fast manner (for example <100 ms). The tunability of the system can exceed 2000 cm−1 or 70 THz, and efficient systems with low peak pump pulse power, for example less than 5 kW or even less than 1 kW, can be realized. This flexibility is achieved in particular by the inventive design comprising the pump pulse generator with additional optical parametric amplification medium, whereby in particular the variability in the pump wavelengths can contribute to a significantly more efficient and larger spreading of the output wavelengths. Furthermore, the design is flexible enough to allow the use of additional optical components or systems between the pump pulse generator and the parametric amplification medium to adapt the power, duration, spectral width and shape of the pump pulses. For this purpose, use is made of the possibility of generating laser pulses with a central wavelength outside the amplification range of classical laser materials by means of parametric amplifier systems, which are subdivided into optical parametric amplifiers and optical parametric oscillators. The parametric amplifier systems convert pump pulses, previously generated by a pump laser, and stimulated by further seed pulses, into wavelength-shifted signal pulses and idler pulses. An important prerequisite for this is a temporal overlap of the seed pulses with the pump pulses in the parametric amplification medium.

This is in contrast to the state-of-the-art systems, which either allow for only very small wavelength changes or in which the change between different wavelengths occurs on a time scale (>100 ms to a few seconds) that is not suitable for modern high-performance spectroscopy, e.g. in modern nonlinear or fluorescence based microscopy. In addition, these well-known systems always require the independent control of two parameters (repetition rate and central wavelength), which results in an increased material costs and control engineering efforts. Another disadvantage of the known systems is that typical designs do not allow for a complete integration into robust fiber optics technology, which makes a successful, cost-efficient and low-maintenance application outside of specialized laser laboratories considerably more difficult or even impossible.

The system according to the invention generates laser pulses of variable wavelength. This means that the system can not only provide laser pulses of a fixed or, in the case of output of a wavelength range, of a single central wavelength, but that laser pulses of different wavelengths or central wavelengths can be provided. In the following the term wavelength is used synonymously for the central wavelength if the laser system in question outputs a range of wavelengths. In particular, the tunable system consisting of a pump pulse generator and an optical parametric amplification medium can provide different output laser pulses with wavelength differences of up to several hundred nanometers.

The pump pulse generator generates the pump pulses, which are fed into the optical parametric gain medium. The pump pulse generator can provide laser pulses of different wavelengths and repetition rates, either with wavelength or repetition rate control. The pump pulse generator can have or include one or more optical amplifier chains and one or more spectral filters. For example, a pump pulse generator usable in accordance with the invention may be a passive mode-locked pump pulse generator, such as a mode-locked fiber laser. In addition, it is also possible to decouple part of the power from the pump pulse generator to generate the seed pulses.

The optical parametric amplification medium can be used in optical parametric oscillators (OPOs) or optical parametric amplifiers (OPAs). These systems can be fiber based (FOPO, FOPA). The optical parametric amplification medium is characterized by the fact that the incident pump pulses, stimulated by further seed pulses, are converted into wavelength-shifted signal pulses and wavelength-shifted idler pulses. The wavelengths of the output waves and thus the conversion in the optical parametric amplification medium is performed according to the known relationships (energy conservation and phase matching) of nonlinear optics.

The wavelength of the pump pulses leaving the pump pulse generator can be adjusted both directly and by means of the repetition rate of the pump pulse generator. The pump pulse generators which can be used according to the invention are thus capable of providing pump pulses with a wavelength within a certain range. The wavelength of the outgoing laser pulses can be adjusted independently either by means of the repetition rate of the pump pulses, e.g. by electro-optical modulation at the desired repetition rate, or directly, e.g. by an electrically adjustable wavelength filter.

If a wavelength change of the pump pulse occurs either in a manner controlled by the repetition rate or directly, a change of the respective other parameter occurs simultaneously. The adjustment of one parameter is therefore immediate and simultaneous to the change of the other parameter. This ensures that after a wavelength change the system adapts very quickly to the new wavelength and the full pulse power can be made available. This is in contrast to state-of-the-art systems in which adaptation is not simultaneous but consecutive, for example by adjusting a filter and subsequently changing the length of the resonator.

By simultaneously changing the wavelength and the repetition rate it is achieved that pump pulses and seed pulses overlap in time in the optical parametric amplification medium. The overlapping of the two pulses leads to an optimal amplification in the parametric amplification medium, and high output powers can be provided again within very short times after the wavelength change. A temporal overlap of the pump pulses and seed pulses occurs when, within the same time interval, both pump pulses and seed pulses make a joint contribution to the power of the laser system's output pulses.

In a preferred configuration of the system, the simultaneous change of the repetition rate when changing the wavelength or the simultaneous change of the wavelength when changing the repetition rate of the pump pulse generator can be achieved by an additional optically dispersive element. The additional optically dispersive element allows the system to be designed in such a way that a simultaneous and simultaneous adjustment of repetition rate and wavelength is achieved. Optically dispersive elements are those elements which are in principle able to give light waves a different propagation speed (phase velocity) as a function of their wavelength. Furthermore, it can be advantageous to be able to fine-tune the amount of dispersion afterwards in order to achieve a particularly good adjustment of the arrival time of pump pulse and seed pulse in the parametric amplification medium for all wavelengths to be amplified.

The amount of dispersion of the dispersive element can be derived from the different group velocities of pulses of different wavelengths. The dispersion has the consequence that when tuning, i.e. changing the pump wavelength and the corresponding seed wavelength, an overlap that has been set once for a pair of pump wavelength and seed wavelength is usually not preserved:

The period of revolution τ(ω), resp. the repetition rate R=1/τ in a pump pulse generator can be calculated from the group velocity $v_g(\omega)$ resp. the group delay per length $\beta_1(\omega)$= $1/v_g$ and the lengths $L_i$ of the used components for each frequency:

$$\tau(\omega) = \sum_i \beta_1^i L_i.$$

For example, for a change of the wavelength from 1020 nm to 1050 nm in a typical pump pulse generator based on an ytterbium fiber laser with a repetition rate of about 10 MHz, the period of revolution is shortened by about 3 ps, which corresponds to a change of the repetition rate of about 3 kHz. If, for example, the seed radiation is generated and amplified in a typical optical parametric oscillator (OPO) also based on glass fibers (parametric amplification medium e.g. NKT Photonics LMA-PM-5), the period of revolution between the seed wavelengths of 749 nm and 930 nm belonging to the respective pump wavelengths is shortened by about 400 ps due to the larger wavelength change. An existing temporal overlap of a corresponding pump pulse and seed pulse cannot be maintained for pump pulses of a duration t<<400 ps without changing the period of revolution in the pump pulse generator or OPO (e.g. by changing the length L) when tuning the wavelength. In the example given above, the length of the pump pulse generator would have to be shortened by about 12 cm, e.g. by using mechanical delay rails.

In general, a frequency-dependent mismatch Δτ of the time interval between the corresponding seed pulse and pump pulse can be defined:

$$\Delta\tau(\omega_p) = t^{Seed}(\omega_s(\omega_p)) - t^{Pumpe}(\omega_p).$$

This mismatch is compensated by an additional element with a suitable dispersion, preferably in the pump pulse generator. A mathematical calculation of the required amount of additional dispersion can be done by a Taylor expansion of the mismatch Δτ by the pump wavelength ow $$\Delta\tau(\omega_p) \approx \tau_0 + \tau_1(\omega_p - \omega_0) + \frac{\tau_2}{2}(\omega_p - \omega_0)^2 + \ldots.$$

The dispersion of the additional dispersive element of length L can be chosen according to this estimation with $\beta_2^*L=\tau_1$, $\beta_3^*L=\tau_2$ etc. Typically, a development of the mismatch Δτ up to the second order and a control of the dispersion up to the third order β3 based on this is sufficient to ensure sufficient compensation. However, it can also be advantageous to compensate for higher orders. In this way a fast detuning of the laser system over a particularly wide range can be made possible.

Within a preferred embodiment of the system, the additional optically dispersive element can be selected from the group consisting of chirped Bragg structures, gratings, prisms, or combinations thereof. Especially this group of optically dispersive elements has proven to be very efficient in achieving a simultaneous adaptation between repetition rate and wavelength. These elements can be easily integrated into fiber optic systems and require a minimum of maintenance. In this respect, low-cost and robust systems can also be provided for applications in "industrial" environments.

In a further advantageous design of the system, the additional optically dispersive element can be a chirped fiber bragg grating (C-FBG). In particular, the use of chirped fiber Bragg gratings as an additional dispersive element can help to obtain the widest possible tunable wavelength range. In addition, these structures can be fine-tuned so that the maximum possible overlap of pump pulse and seed pulse is obtained. A further advantage is that the chirped fiber Bragg grating that can be used, for example, can also be used as a decoupling element for the radiation from the resonator that is to be used. However, it is also possible that a pump pulse generator according to the invention has an additional decoupling unit. If a particularly high level of control is required, a possible design can also use commercially available thermally fine-tunable C-FBGs. However, more complex temperature profiles can also be applied to the C-FBG.

In another aspect of the system, the wavelength of the pump pulse generator can be changed via an adjustable spectral filter. In addition to the possibility of a simple and direct selection of the wavelength, a further advantage is that the filter band width determines the pulse properties of the pump pulse generator (spectral width and temporal duration as well as the temporal chirp) and thus a greater control over the generated pump pulses is gained. The spectral width and temporal duration of the pump pulses provide more control over the spectral width and temporal duration of the pulses generated in the parametric amplification medium.

In a version of a pump pulse generator with spectral filter, saturable absorber mirrors (SAM), e.g. in a linear resonator geometry, can be used as passive mode coupling elements, as well as fast (<100 ms) detunable optical filters for adjusting the wavelength and, coupled to it, the repetition rate. For this purpose, e.g. Fabry-Perot filters tunable via piezoelectric effects (e.g. fiber-coupled), acousto-optical filters, but also optical gratings (e.g. in a reflective Littrow arrangement) in combination with fast beam deflectors can be considered.

A further embodiment can use active mode coupling. To control the repetition rate and the emission wavelength, an electro-optical modulator, e.g. based on lithium niobate, can be used. However, other modulation methods, e.g. acousto-optical modulation, can also be used.

In a preferred embodiment of the system, at least a part of the additional optical dispersive element can be located outside the pump pulse generator. This design allows for a particularly flexible setup and can contribute to the use of standard wavelength tunable pump pulse lasers. In this case, the coupling between the repetition rate and wavelength, as required by the invention, takes place entirely in or before the optical parametric amplification medium. This can reduce the cost of the laser system and simplify maintenance operations.

In a preferred configuration of the system, the repetition rate of the pump pulses is an integer multiple of the repetition rate of the seed pulses. In this configuration, the additional optically dispersive element is selected so that the adjustment between repetition rate and wavelength is designed for different repetition rates of pump pulse generator and seed pulses. The special feature of this design is that the repetition rate of a power component of the pump pulse radiation is only reduced to the repetition rate of the seed pulses after generation in the generator, e.g. with an electro-optical modulator as a so-called "pulse picker". This has the advantage that the remaining part of the pump pulses is available at a higher repetition rate, which makes it possible to use the generated light directly in lock-in detection methods, e.g. in the detection of coherent Raman scattering.

Furthermore, the parametric amplification as well as the seed pulse generation can preferably be done in an optical parametric oscillator (OPO). When using an OPO to generate the wavelength-shifted signal radiation and wavelength-shifted idler radiation, the seed radiation is generated by the pump pulses in the parametric amplification medium in a spontaneous process and superimposed by a feedback with the next pump pulses. This design offers the advantage of a cost-effective realization, since no external seed pulse generation is required. Furthermore, the system can be operated very efficiently due to the additional superelevation of the seed pulse energy.

In a further embodiment of the system, the seed pulses can be generated from a fraction of the pump pulses and these seed pulses can be delayed by the inverse of the repetition rate of the pump pulses in the parametric amplification medium before they are superimposed with the pump pulses. This setup allows the separate generation of the seed pulses before they are amplified in the parametric amplification medium. This use of an OPA, i.e. single-pass amplification, reduces the complexity of the overall system. A further advantage of this design is the possibility to use particularly efficient seed pulse generation mechanisms known from other areas of nonlinear photonics, such as spectral broadening by self-phase modulation, supercontinuum generation or soliton-self-frequency shift by stimulated spatial scattering.

In an additional characteristic of the system, the repetition rate of the pump pulse generator can be greater than or equal to 5 MHz and less than or equal to 80 MHz and the group velocity dispersion of the additional optically dispersive element can be less than or equal to 15 ps2 and greater than or equal to 0.5 ps2. Within these parameter ranges, a particularly efficient coupling between repetition rate and wavelength can be achieved by very stable and commercially available C-FBGs. This results in a highly tunable laser, which returns to its original power very quickly after wavelength change. This allows the use in modern spectroscopic methods, especially for the investigation of biological systems. Here, laser systems with repetition rates between 5 and 80 MHz are of particular advantage because they offer an efficient compromise between high signal yield and low probability of damage to biological cells. Larger dispersions or group velocity dispersions can be disadvantageous, since the dispersive elements required for this are very complex and can only be manufactured at high costs. In addition, these elements are usually very susceptible to temperature fluctuations, for example. Smaller dispersions or group velocity dispersions can be disadvantageous, because the relative error in the production of chirped Bragg structures with low dispersion becomes larger and larger. This can lead to the fact that the temporal overlap achieved by the coupling of wavelength and repetition rate becomes smaller and smaller and thus the desired generation of detunable wavelengths becomes more inefficient or is no longer possible.

In a further aspect, fiber-based optical amplifiers can be used between the pump pulse generator and the parametric amplification medium. These amplifiers can consist of several stages and be designed, for example, as single-mode preamplifiers and main amplifiers with a large fiber core, i.e. a so-called "Large-Mode Area" fiber, whereby the amplifier fiber can be designed, for example, as an ytterbium-doped polarization-maintaining glass fiber.

In a further design, the "chirp" of the pump pulses can be specifically adjusted to achieve a wider or respectively narrower instantaneous gain bandwidth centered around the gain maximum. Furthermore, especially when using spectrally broadband and thus bandwidth-limited very short pump pulses (e.g. <10 ps), it can be advantageous to stretch ("chirp") them before feeding them into the parametric gain medium, e.g. to reduce disturbing nonlinear effects like self-phase modulation.

In an additional embodiment, the fiber laser can be constructed entirely in fiber optics technology, in particular from polarization-maintaining glass fibers.

Furthermore, a method for changing the wavelength of laser pulses using an optical parametric amplification medium, which comprises at least the steps
 a) Generation of pump pulses with defined wavelength and defined repetition rate,
 b) Generation of seed pulses,
 c) Superimposing the seed pulses and pump pulses in the optical parametric amplification medium,
characterized in that when one of the wavelength or the repetition rate of the pump pulse changes, the other one of the wavelength or the repetition rate changes simultaneously in such a way that a temporal overlap of the pump pulses and the seed pulses in the optical parametric amplification medium is ensured. By means of the method according to the invention, rapid changes of the output wavelength of the optical parametric amplification medium can be achieved, whereby in particular the maximum output intensity of the pulses is reached again very quickly after a wavelength change. The method is therefore suitable for spectroscopic applications which depend on flexible examination wavelengths at constant output power. Previous laser methods, which can provide different output wavelengths, achieve a constant output power only at the expense of longer switching times. This is due to the fact that several parameters have to be changed independently and consecutively and/or that mechanical elements have to be used which have a significantly higher response time. The components used here do not have to be mechanically designed and in the optimal case allow a switching time on the order of magnitude of the electrical switching time of the components.

In step a) of the method, pump pulses with defined wavelength and defined repetition rate are generated. This implies that the pump pulses are defined by a specific pair of values, namely wavelength and repetition rate. This does not mean that these two parameters are fixed in the sense that wavelength and repetition rate are not changeable. The generation of the defined pump pulses can be done by the above-described pump pulse generators.

In step b) seed pulses are generated. This step can be done by a separate seed pulse generator or by decoupler and, if necessary, by processing a part of the pump pulses.

In step c), the seed pulses and the pump pulses are superimposed in the optical parametric amplification medium. This can be done, for example, by feeding the two pulses simultaneously into the amplification medium. According to the invention, a superposition occurs when both pump and seed pulses contribute to the power of the laser system output pulses within the same time interval.

The method is designed in such a way that if one of the wavelength or the repetition rate of the pump pulses changes, the other of the wavelength or the repetition rate changes simultaneously. Thus, within the method according to the invention, the two parameters wavelength and repetition rate are not considered to be largely independent of each other, but rather one parameter is specifically adjusted when the other parameter is changed. This is in contrast to methods of the state of the art, which do without a specific coupling of both parameters.

In a preferred design of the method the simultaneous change of wavelength and repetition rate of the pump pulses can be achieved by means of a dispersive element. The dispersive elements described above are able to guarantee a fast and efficient coupling between repetition rate and wavelength of the pump pulse laser. Thus, widely tunable and quickly switchable methods can be realized.

Within another aspect of the method, the wavelength of the laser pulses can be changed by a simultaneous variation of the pump pulse wavelength and repetition rate within less than or equal to 100 ms. The method enables a fast achievement of the desired output power after a wavelength change by simultaneous coupling between repetition rate and wavelength without the use of mechanical components. In this respect, switching times can be realized which were not possible with the methods known so far.

The aforementioned components as well as the components to be used in accordance with the invention and described in the design examples are not subject to any particular exceptional conditions with regard to their size, shape, design, choice of material and technical concepts, so that the selection criteria known in the field of application can be applied without restriction.

Further details, features and advantages of the subject matter of the invention result from the sub-claims as well as from the following description of the associated drawings, in which—as an example—several preferred design examples of the concept according to the invention are presented.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
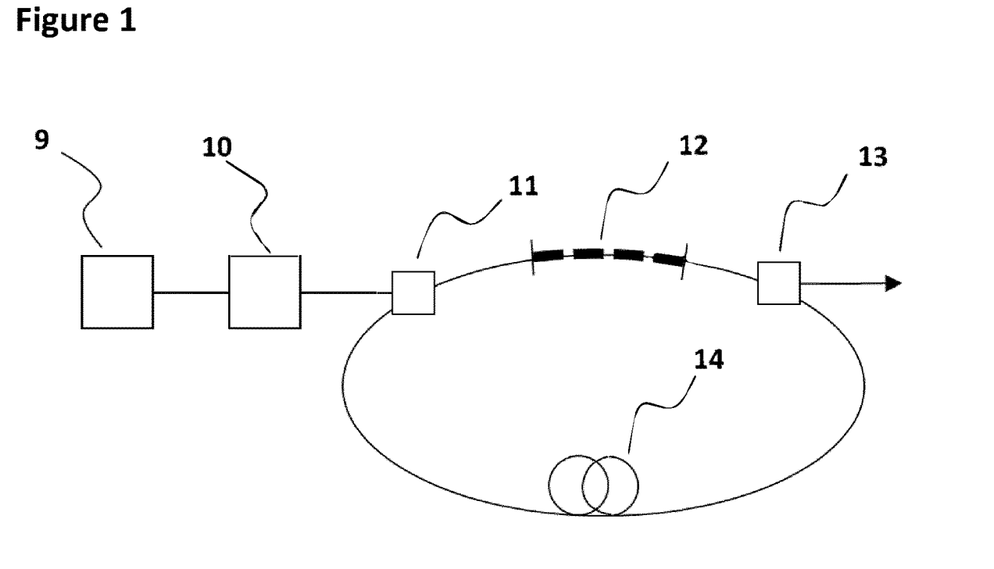
FIG. 1 a system for generating output laser pulses with a tunable wavelength based on parametric amplification according to a preferred embodiment of the invention in the form of a pump pulse generator (9), an amplifier (10) and a fiber-based OPO.

FIG. 1 shows a preferred design of the laser system. The pump pulse generator (9) is brought to the required peak power (e.g. 1 kW) by an optical amplifier chain (10) before its output beam is coupled into the FOPO. The pump pulses are superimposed with seed pulses via a WDM coupler (11) in a parametric amplifier fiber (12). The amplified pulses (signal, idler or preferably both, as well as the remaining pump pulses) are coupled out (e.g. 80%) via a fiber-based coupler (13) and the rest is fed back via a feedback fiber (14).

Figure 2:
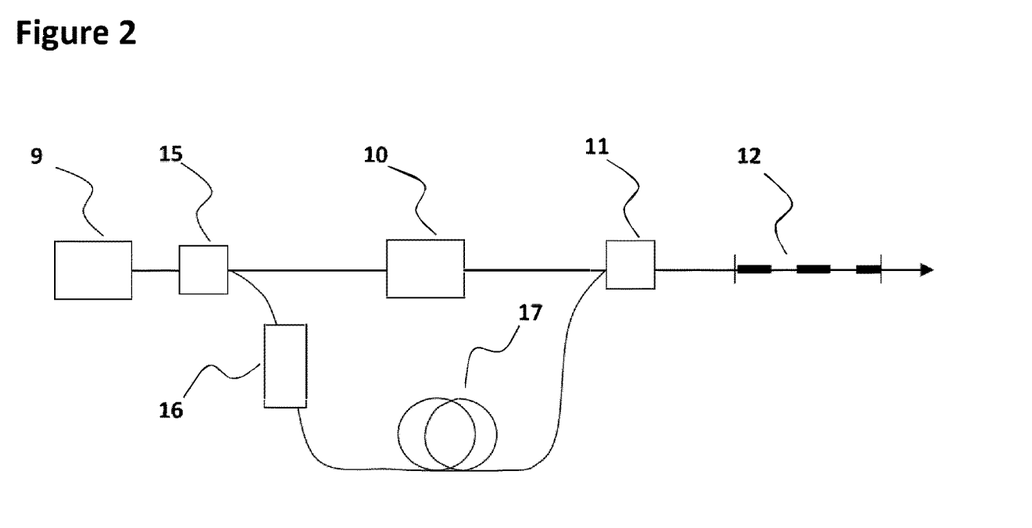
FIG. 2 a further system for generating output laser pulses with a tunable wavelength based on a parametric gain according to a preferred embodiment of the invention in the form of a pump pulse generator (9), an amplifier (10) and a fiber-based OPO.

FIG. 2 shows another preferred version of the laser system based on an OPA. The pulses generated in the pump pulse generator (9) in a dispersion-matched manner are divided by a coupler (15) into an arm for pump pulse amplification (with fiber amplifier chain (10)) and an arm for seed pulse generation. The seed pulse is preferably generated by supercontinuum generation (16), if necessary by use of optical amplifiers. Other methods of seed pulse generation, e.g. stimulated Raman scattering, are also possible. The seed pulse is superimposed by a delay fiber (17) and a WDM coupler (11) with a pump pulse following in the pump pulse train and then amplified in a parametric amplifier fiber (12). The coupling of the repetition rate of the pump pulse to the wavelength of the pump pulse is chosen to match the dispersion in the seed gut (see FIG. 8), taking into account the dispersion acting on the pump pulses in the amplifier arm (10). In comparison to the FOPO in FIG. 1, the entire seed generating arm takes the role of the FOPO resonator after the splitting of the pump pulse, and the dispersion of the entire pump pulse amplifying arm must be added to the dispersion within the pump pulse generator.

Figure 3:
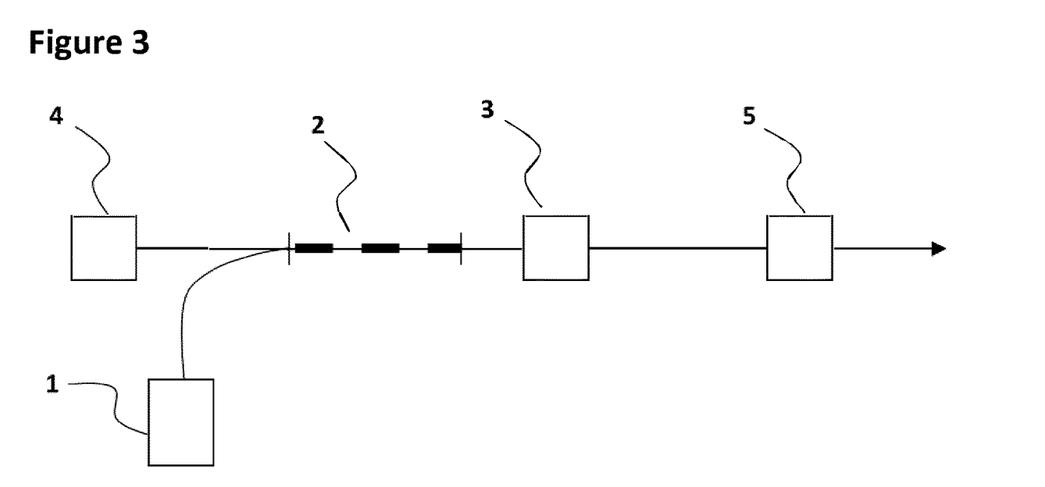
FIG. 3 a pump pulse generator with suitable coupling of repetition rate to wavelength according to a preferred embodiment of the invention.

FIG. 3 schematically shows a passive mode-locked fiber laser as pump pulse generator for use in the system of the invention. The fiber laser can be constructed entirely in fiber optics technology, in particular polarization-maintaining glass fibers, and is pumped by a fiber-coupled pump diode (1), which provides the amplification in the actively doped amplifier fiber (2) shown as thick dashed lines. The amplifier fiber can be an ytterbium-doped polarization-maintaining glass fiber. Inside the resonator an electronically tunable bandpass filter (3) can be used to control the emitted wavelength. The saturable absorber mirror (4) used is preferably applied directly to a glass fiber. The second end mirror in the linear resonator is formed by the "chirped" fiber Bragg grating (5), which also serves as an output element. The dispersive element (5) impresses a large part of the total dispersion in the resonator on the circulating laser light and thus ensures a strongly wavelength-length-dependent period of revolution. In this way, the coupling of the repetition rate to the given wavelength can be controlled.

Figure 4:
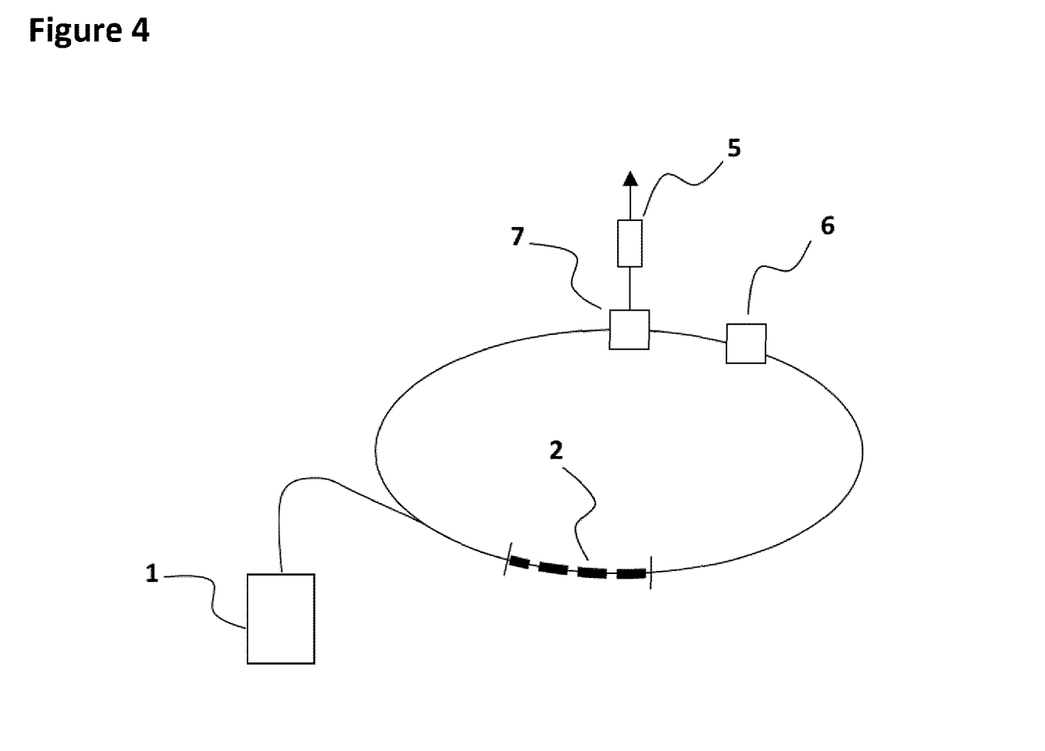
FIG. 4 another pump pulse generator with suitable coupling of repetition rate to wavelength according to a preferred embodiment of the invention.

FIG. 4 shows another version of a laser system which uses active mode coupling. The ring resonator can consist of polarization-maintaining glass fiber. An electro-optical modulator (6) is used to start the mode coupling and control the repetition rate. The dispersion of the fiber resonator is adjusted by a C-FBG (5), which can also serve as an output mirror. Alternatively, an additional coupler can be built into the resonator. To use the reflective C-FBG in a ring resonator, a circulator (7) is used.

Figure 5:
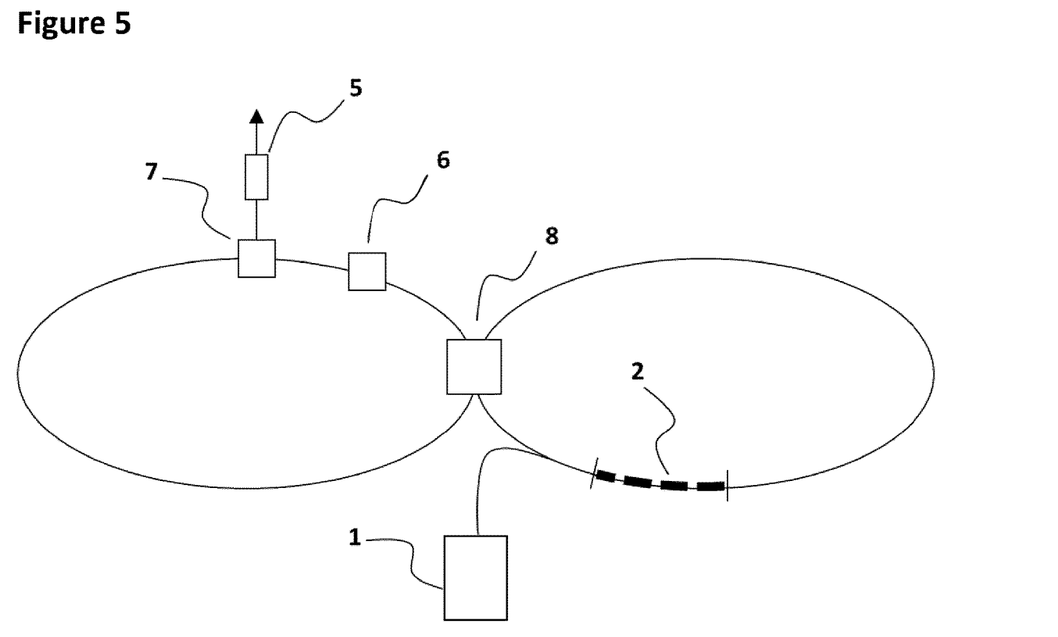
FIG. 5 another pump pulse generator with suitable coupling of repetition rate to wavelength according to a preferred embodiment of the invention.

FIG. 5 shows a further design of a possible pump pulse generator, which uses artificial passive mode coupling to shorten the emitted pulse duration (e.g. below 50 ps or below 10 ps at repetition rates of e.g. 50 MHz or 10 MHz). The "nonlinear amplifying loop mirror" (NALM) used for this purpose consists of an amplifier fiber (2) made of passive polarization-maintaining glass fiber pumped by the pump diode (1). It is connected to the actual resonator ring by a fiber-based coupler (8). The coupler can preferably provide an asymmetrical splitting ratio (e.g. The wavelength can be controlled by an electronically tunable bandpass filter. The circulator (7) used here additionally ensures a clockwise direction of rotation in the left fiber ring and blocks light components reflected from the NALM. The dispersion of the fiber resonator is again adjusted by a C-FBG (5). It can be advantageous to use an amplifier fiber with its own pump diode in the main ring of the resonator as well, e.g. to adjust the power in the resonator independently of the gain in the NALM.

Figure 6:
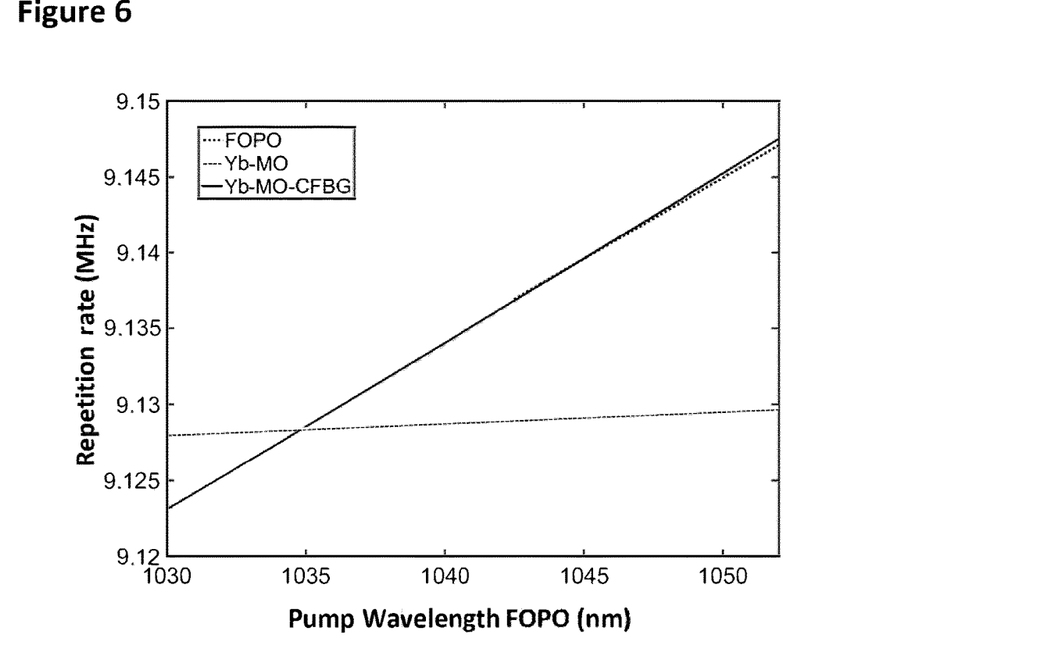
FIG. 6 an example of the change of the repetition rate of an ytterbium master oscillator (Yb-MO, dotted line) at the change of wavelength compared to the repetition rate required to pump a FOPO based on a commercial photonic crystal barrel (dotted line). Also shown is the resultant repetition rate change in dispersion matching of a Yb-MO with a chirped fiber bragg grating C-FBG (solid line)

FIG. 6 shows as an example a theoretical calculation of the adjustment of the resonator dispersion of an active-mode-coupled pump pulse generator (Yb-MO) according to the invention to ensure simultaneous gain and time overlap in a FOPO resonator consisting of a 50 cm long parametric amplifier fiber (LMA-PM-5) and feedback fiber (PM-980). The X-axis shows the pump wavelength versus the repetition rate. A typical active-mode coupled ytterbium fiber laser with a repetition rate of about 10 MHz changes its repetition rate by only <5 kHz when the pump pulse wavelength changes from 1020 nm to 1050 nm due to the dispersion of commonly used optical fibers. However, the signal wavelengths corresponding to the pump pulse wavelengths at the maximum parametric gain (in the range from about 750 nm to about 950 nm) show different repetition rates by about 40 kHz in a FOPO based on a parametric amplifier fiber (LMA-PM-5) and a feedback fiber (PM-980) (curve labeled FOPO). The use of an additional dispersive element in the form of a C-FBG with ($\beta 2=+6.91$ ps$^2$ and ($\beta 3=0.018$ ps$^3$ in the pump pulse generator causes an adjustment of the repetition rate in the pump pulse generator, shown by the solid line, thus ensuring a temporal overlap of seed pulses and the pump pulses in the parametric amplifier fiber when the pump wavelength changes.

Figure 7:
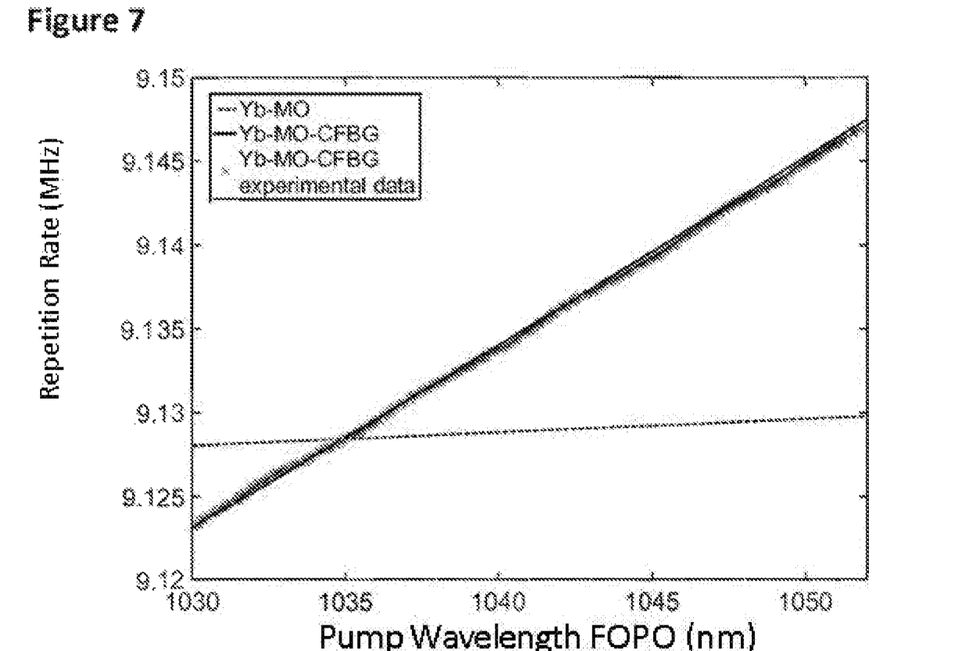
FIG. 7 an experimental implementation of the appropriate coupling of repetition rate to wavelength. Shown are the theoretical curves from FIG. 6 (Yb—Mo-CFBG solid line, Yb—Mo dashed line) and the experimentally measured values of a Yb—Mo with a C-FBG in the resonator (crosses)

FIG. 7 shows an experimental implementation of the scenario shown in FIG. 6. On the X-axis the pump wavelength is plotted against the theoretically calculated repetition rate for a Yb-MO and a Yb-MO adjusted with a C-FBG with $\beta 2=+6.91$ ps$^2$, $\beta 3=0.018$ ps$^3$. The crosses show the measured repetition rate of a version of such an adapted pump pulse generator as a function of the electronic tuning of the wavelength.

Figure 8:
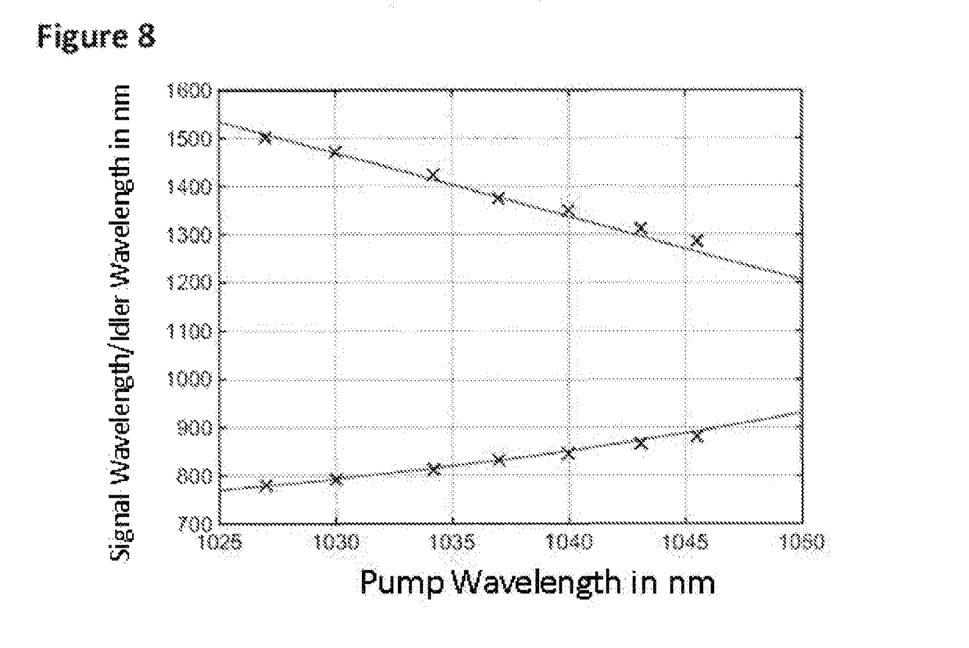
FIG. 8 is an example of the tuning curve of a FOPO (signal wavelength and idler wavelength in dependence of the central pump wavelength) realized with a commercial photonic crystal fiber (NKT-Photonics LMAS). The solid lines show the theoretical curve and the crosses the experimentally achieved values. The tuning was done purely by electronically detuning a filter in the pump pulse generator; with a normal FOPO, the resonator length would have had to be mechanically altered by 10.8 cm by a delay bar.

FIG. 8 shows an example of the tuning curve of a FOPO based on a commercial photonic crystal fiber (LMA-PM-5) and a pump pulse generator adapted according to the invention (adaptation result is described in FIG. 7). For tuning, only the wavelength of the pump pulses was electronically detuned. No mechanical (re-)adjustment or length adjustment of the system took place. The electronically adjusted wavelength of the pump pulse generator on the X-axis and the wavelengths of the signal radiation and the idler radiation on the Y-axis are plotted. The solid lines show the theoretically expected course and the crosses the experimentally achieved results. With the used repetition rate of the pump laser, either the length of the FOPO or that of the pump laser resonator would have had to be changed by approx. 10.8 cm during the tuning process in an ordinary FOPO system, e.g. by the mechanical method of a delay rail by 5.4 cm.

Figure 9A:
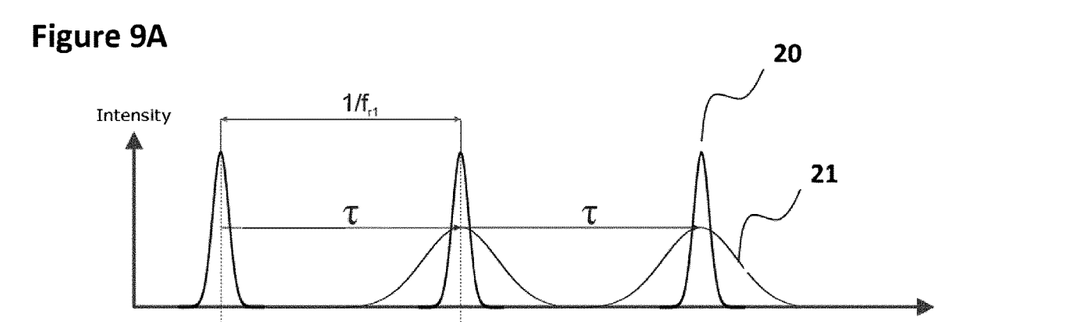
FIG. 9 the dependence of the temporal overlap in a FOPA of pump pulse and a "chirped" seed pulse on the repetition rate fr1 in a) and fr2 in b), if the seed pulse is generated by a preceding pump pulse and delayed by a fixed time τ to this.
Figure 9B:
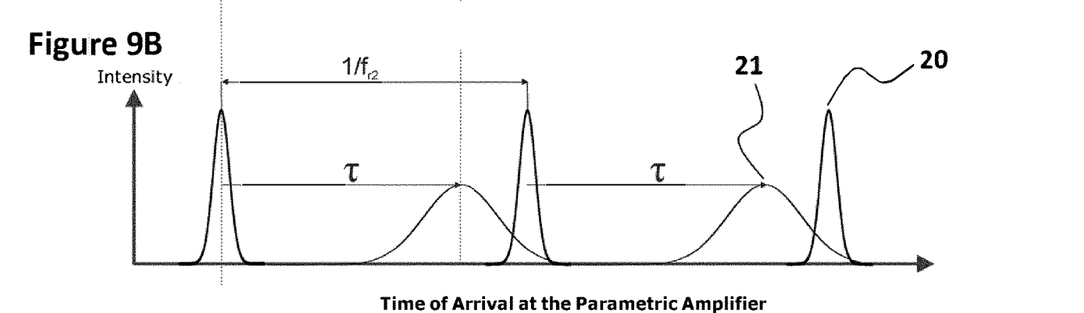

FIG. 9 shows exemplarily and schematically in a "delayed-FOPA" the dependence of the time overlap of the pump (20) and seed (21) pulses on the repetition rate. In this scheme, broadband and strongly chirped seed pulses (21) were generated by a preceding pump pulse (20) and experienced an additional, but repetition rate-independent delay τ (e.g. by the seed generation arm in FIG. 2). The seed pulses (21) stretched by the dispersion are now superimposed by the following pump pulses (20). If the repetition rate of the pump pulses (20) changes from fr1 to fr2, the time point (relative to the preceding pump pulses (20)) of the arrival of the following pulses in the amplifying medium changes, but not the time point of the arrival of the seed pulses (21). The repetition rate thus determines the time overlap between chirped seed pulses (21) and the pump pulses (20).

REFERENCE CHARACTER LIST

1 Pump diode
2 Amplifier fiber
3 Electronically tunable spectral filter
4 Saturable absorber mirror
5 Chirped Bragg grating
6 Modulator
7 Circulator
8 Coupler
9 Pump pulse generator (dispersion adapted)
10 Optical fiber amplifier
11 WDM coupler
12 Parametric amplifier fiber
13 decoupler
14 Feedback fiber
15 Coupler
16 Seed pulse generation
17 Retardation fiber
20 Pump pulse
21 Seed pulse

The invention claimed is:

1. A system for generating laser pulses of variable wavelength, comprising:
    a pump pulse generator for generating pump pulses, wherein the pump pulse generator is a mode-locked pump pulse generator;
    an optical parametric amplification medium pumped by the pump pulse generator, which converts incoming pump pulses, stimulated by further seed pulses, into wavelength shifted signal pulses and idler pulses; and
    an optically dispersive element;
    wherein a wavelength of the pump pulses is adjustable either directly or by means of the repetition rate of the pump pulse generator, and wherein, in the event of a change of one of the repetition rate or the wavelength, the other one of the repetition rate or the wavelength simultaneously changes by means of the optically dispersive element in such a way that the pump pulses and the seed pulses temporally overlap in the optical parametric amplification medium.

2. The system according to claim 1, wherein the optically dispersive element is selected from the group consisting of chirped Bragg structures, gratings, prisms or combinations thereof.

3. The system according to claim 1, wherein the optically dispersive element is a chirped Bragg grating.

4. The system according to claim 1, where the change of the wavelength of the pump pulse generator is effected by an adjustable spectral filter.

5. The system according to claim 1, wherein at least a part of the optically dispersive element is arranged outside the pump pulse generator.

6. The system according to claim 1, wherein the repetition rate of the pump pulse generator is an integer multiple of the repetition rate of the seed pulses.

7. The system according to claim 1, wherein both a parametric amplification and a seed pulse generation are performed in an optical parametric oscillator (OPO).

8. The system according to claim 1, wherein the parametric amplification is carried out in an optically parametric amplifier (OPA), the seed pulses are generated from a portion of the pump pulses and these seed pulses are delayed in time by the inverse of the repetition rate of the pump pulses before being superimposed with the pump pulses and are thus superimposed with a subsequent pump pulse of the pump pulse train.

9. The system according to claim 1, wherein the repetition rate of the pump pulse generator is greater than or equal to 5 MHz and less than or equal to 80 MHz, and the group velocity dispersion of the optically dispersive element is less than or equal to 15 $ps^2$ and greater than or equal to 0.5 $ps^2$.

10. A method for changing the wavelength of laser pulses using an optically parametric gain medium comprising at least the steps of:
a) generation of pump pulses with defined wavelength and defined repetition rate by means of a mode-locked pump pulse generator,
b) generation of seed pulses,
c) superposition of the seed pulses and pump pulses in the optically parametric amplification medium,
wherein in the event of one of the wavelength or the repetition rate of the pump pulse changing, the other one of the wavelength or the repetition rate changes by means of an optically dispersive element simultaneously in such a way that a temporal overlap of the pump pulse and seed pulses in the optically parametric amplification medium is effected.

11. The method according to claim 10, wherein the simultaneous change of wavelength and repetition rate of the pump pulses is effected by means of an optically dispersive element.

12. The method according to claim 10, wherein the change in wavelength of the laser pulses is effected by a simultaneous variation of pump pulse wavelength and repetition rate within less than or equal to 100 ms.

* * * * *